US005440119A

United States Patent [19]

Labowsky

[11] Patent Number: 5,440,119

[45] Date of Patent: Aug. 8, 1995

[54] METHOD FOR ELIMINATING NOISE AND ARTIFACT PEAKS IN THE DECONVOLUTION OF MULTIPLY CHARGED MASS SPECTRA

[76] Inventor: Michael J. Labowsky, 67 Howe Ave., Wayne, N.J. 07470

[21] Appl. No.: 220,369

[22] Filed: Mar. 30, 1994

Related U.S. Application Data

[63] Continuation-in-part of Ser. No. 892,113, Jun. 2, 1992, Pat. No. 5,300,771.

[51] Int. Cl.[6] .......... B01D 59/44; H01J 49/02

[52] U.S. Cl. .......... 250/282

[58] Field of Search .......... 250/282, 281, 288

[56] References Cited

U.S. PATENT DOCUMENTS

| | | | |
|---|---|---|---|
| 4,531,056 | 7/1985 | Labowsky et al. | 250/288 |
| 4,542,293 | 9/1985 | Fenn et al. | 250/288 |
| 4,842,701 | 6/1989 | Smith et al. | 250/288 |
| 4,861,988 | 8/1989 | Henion et al. | 250/288 |
| 4,887,706 | 12/1989 | Gladish et al. | 198/774 |
| 5,072,115 | 12/1991 | Zhou | 250/282 |
| 5,130,538 | 7/1992 | Fenn et al. | 250/282 |
| 5,300,771 | 4/1994 | Labowsky | 250/282 |

*Primary Examiner*—Paul M. Dzierzynski
*Assistant Examiner*—Kiet T. Nguyen

[57] ABSTRACT

The invention comprises a method of analyzing the results obtained from the mass analysis of an ensemble or population of multiply charged ions comprising large polyatomic molecules of which is attached a plurality of charges. These molecules can be charged either by the attachment of charged mass or by the loss of charged mass. The charged mass is referred to as the "adduct" ion mass. The measured mass spectrum for such a population of ions generally comprises a sequence of peaks for each distinct polyatomic molecular species, the ions of each peak differing from those of adjacent peaks in the sequence by only a single charge. The method of analysis taught by the invention produces a deconvoluted spectrum in which there is only one peak for each distinct molecular species, the magnitude of that single peak containing contributions from each of the multiplicity of peaks for that species in the measured spectrum. A unique feature of the method taught by the invention is the use of special signal filters and enhancer and averaging techniques which eliminate noise and artifact peaks and make the final spectrum easier to understand and to interpret.

9 Claims, 9 Drawing Sheets

METHOD FOR ELIMINATING NOISE AND ARTIFACT PEAKS IN THE DECONVOLUTION OF MULTIPLY CHARGED MASS SPECTRA

This application is a continuation-in-part of application Ser. No. 07/892,113 filed Jun. 2, 1992, now U.S. Pat. No. 5,300,771.

BACKGROUND OF THE INVENTION

The mass analysis of large or macro molecules was a difficult task prior to the advent of then Electrospray [ES] Ionization technique which is described in a number of U.S. Pat. Nos. (Labowsky et al., 4,531,056; Yamashita et al., 4,542,293; Henion et al. 4,861,988; and Smith et al. 4,842,701 and 4,887,706) and in several recent review articles [Fenn et al., Science 246, 64 (1989); Fenn et al., Mass Spectrometry Reviews 6, 37 (1990); Smith et al., Analytical Chemistry 2, 882 (1990)]. Because of extensive multiple charging ES ions of large molecules almost always have mass/charge (m/z) ratios of less than about 2500 so they can be weighed with relatively simple and inexpensive conventional analyzers.

The multiple charging characteristic of the ES and other ion sources was originally viewed by workers in the field as a detriment. Indeed, mass spectrometrists were accustomed to analyzing spectrum in which each molecule was singly charged. The multiply charged spectrum were looked at as interesting curiosities until Mann. et.al [Interpreting Mass Spectra of Multiply Charged Ions, Anal. Chem. 1989, 61, 1702–1708} and Fenn et.al. (U.S. Pat. No. 5,130,538] revealed a algorithm which transformed the sequence of peaks for a multiply charged ion in the measured spectrum into a "calculated" (also referred to as "deconvoluted") spectrum in which all peaks represented singly charged parent ions. The Mann and Fenn algorithm is based on the fact that there are three unknowns associated with the ions of a particular peak in an measured spectrum: the molecular weight Mr of the parent species, the number i of charges on the ion, and the mass $m_a$ of each adduct charge. Therefore, mass/charge (m/z) values for the ions of any three peaks of the same parent species would fix the values of each unknown. However, there is a relation between the peaks such that they form a sequence, referred to as a "coherent" sequence, in which the number of charges i varies by one from peak to peak. Consequently, the m/z values of any pair of peaks are sufficient to fix Mr for the parent species, provided that the masses of the adduct charges are the same for all ions of all the peaks in the sequence. Using this information, Mann-Fenn devised a summing procedure which deconvoluted the measured spectrum. Indeed, the Mann and Fenn "deconvolution" method allowed for the extremely accurate determinations of molecular weights of very large molecules and greatly expanded the field of mass spectrometry.

In spite of the effectiveness of the Mann-Fenn deconvolution method, as originally described, it suffered from several disadvantages. The most obvious of these disadvantages was the calculated spectrum was very noisy and contained artifact peaks which made the identification of secondary species difficult. The Mann-Fenn method also suffered from a "high mass" bias. In other words, the method tended to attribute a higher signal to larger molecular weight ions. Also, one must known or have a reasonable estimate of the adduct ion mass before implementing the method. In using the Mann-Fenn algorithm one must assume an adduct ion mass. The calculation is then performed in which only the mass of the macromolecule is the only independent variable. As a result, the Mann-Fenn algorithm produces a 2-Dimensional (2-D) spectrum of calculated signal versus mass. Indeed, in principle, the adduct ion mass should be known before hand. In practice, the adduct ion mass may not be known for a number of reasons. First, there may not be a single adduct ion mass, but several such ions which attach to the parent molecule. Second, one may simply guess wrong when assigning the adduct ion mass. If one were to guess that the adduct ion were 1 (for a proton) and the real adduct ion were a protonated water (ma=19), the result obtained by the Mann-Fenn algorithm would be in gross error. Finally, even if the there were only one adduct ion and the user was certain of the mass of that ion, the result obtained by Mann-Fenn could still be in error due to the lack of proper calibration of the mass spectrometer which was used to generate the original spectrum. For these reasons as was pointed out in Labowsky [U.S. Pat. No. 5,300,771] and Labowsky et.al. [Rapid Comm in Mass Spectro, Vol 7, PP 71–84 (1993)] it is best to treat the adduct ion mass as an unknown. The result of such an approach is a 3-Dimensional (3-D) surface of calculated signal versus macromass and adduct ion mass. It should be mentioned that a 2-D calculated spectrum is simply a cross-section of a 3-D calculated surface at a given value for the adduct ion mass.

Noise reduction in the calculated spectrum is important whether the calculation is performed in two dimensions or in three dimensions. If noise and artifact peaks could be reduced or eliminated, then it would be easier to identify the masses of all species that may be represented an measured spectrum. FIG. 1 shows a measured spectrum of Cytochrome C. FIG. 2 shows a 2-D (cross-section) calculation of this spectrum at an adduct ion mass of 1 using the Mann-Fenn algorithm with no noise reduction. FIG. 3 shows the 3-D calculated surface of this spectrum, again with no noise reduction. It is quite clear from an examination of these figures that the presence of secondary and tertiary species which may be present in the measured spectrum may be obscured due to noise and artifact peaks. Conversely, an examination of a noisy calculated spectrum may lead one to conclude that a certain species is present in a measured spectrum if an artifact peak appears at the mass corresponding to that species in the calculated spectrum. For these reasons it is important to develop techniques for reducing the noise in the calculated spectra whether they are 2-D or 3-D.

Attempts to reduce noise and artifact peaks in the basic 2-D algorithm were made by Zhou (U.S. Pat. No. 5,072,115). Using what may be described as a peak subtraction method, Zhou used an iterative method to produce a calculated spectrum from an measured spectrum. In the first step of this iteration, the Mann-Fenn algorithm is applied to the measured spectrum to find the mass of the dominate species represented in the measured spectrum. In the second iteration, the Mann-Fenn algorithm is then applied to the measured spectrum in which the peaks associated with the dominant species were, by some means, subtracted out. In so doing, Zhou was able to calculate the mass of the next species. In the third iteration the Mann-Fenn algorithm again applied to a spectrum in which the peaks of the dominant and the second species are subtracted out to find the third species and so on. The process of identifying species and subtracting their peaks out from the measured spectrum is then repeated until all species have been identified. A final calculated spectrum is presented which has less noise and fewer artifact peaks than that produced by a single iteration of the Mann-Fenn algorithm.

While the method of Zhou represents an improvement of the basic Mann-Fenn algorithm, it involves several iterations to obtain a final solution. Further, it has been applied to obtain only 2-D calculated spectra. An application of this method to obtain a 3-D surface would be tedious in light of the large number of calculations that an iterative method would require to generate a 3-D surface.

OBJECTS OF THE INVENTION

It is the object of this invention to provide a method to eliminate noise and artifact peaks using noise filters in calculated spectra (whether 2-D or 3-D) thereby making the identification of all species present in measured spectrum easier than in the case of a calculated spectrum produced by the Mann-Fenn algorithm.

It is also an object of this invention to produce a calculated spectrum (whether 2-D or 3-D) without the need for an iterative calculation.

The method comprises a number of steps. First the measured spectrum must be generated by conveying the sample to be analyzed to a multiple charging apparatus where the multiply charged ions are formed. The multiply charged ions are then conveyed to a mass spectrometer and mass analyzed producing a collection of data points of Intensity versus mass/charge ratio. These collection of data points may be represented as spectrum of Intensity versus mass. This spectrum is referred to as the "measured" spectrum. The information in this measured spectrum is then processed using suitable noise filters to produce a 2-D calculated spectrum in which noise and artifact peaks have been suppressed. Alternatively, the information in the measured spectrum may be processed using suitable noise filters to produce a 3-D calculated spectrum in which noise and artifact peaks have been suppressed. The calculated spectra are then examined to identify the species that are represented in the measured spectrum.

SUMMARY OF THE INVENTION

In summary, the patent describes a method by which the spectrum of a multiply charged molecule can be transformed so as to make easier the identification of the molecular weight of the specie or species present in the spectrum. This method can be applied to either three dimensional 3-D surfaces in which the parent molecule molecular weight and the adduct ion mass are treated as independent variables or to the 2-D cross-sections of such surfaces. This method includes the following steps:

1. Producing a measured spectrum by passing a solution containing the molecules to be analyzed through a mass spectrometer.
2. Representing this spectrum as a graph or as a series of data points of measured signal versus m/z.
3. Choosing the region of interest for the deconvoluted spectrum including the range of parent molecular weights to be considered and the range of adduct ion masses to be considered.
4. Deconvoluting the measured spectrum to produce a spectrum of calculated signal versus mass of the parent molecule and the mass of the adduct ion for the case of a 3-D deconvolution or versus the mass of the parent molecule only in the case of a 2-D deconvolution.
5. Applying filters based on coherence to eliminate noise and undesirable peaks from the deconvolution spectrum.
6. Employing enhancer factors, as needed, to accentuate certain peaks in the deconvoluted spectrum which may be of interest.
7. Employing averaging factors, as needed, to accentuate certain peaks in the deconvoluted spectrum and to reduce the high mass bias associated with other deconvolution algorithms.
8. Identifying based on the filtered, enhanced and/or averaged spectrums the molecular weights of the specie or species present in the original solution.

DETAILED DESCRIPTION OF THE INVENTION

Figure 1:
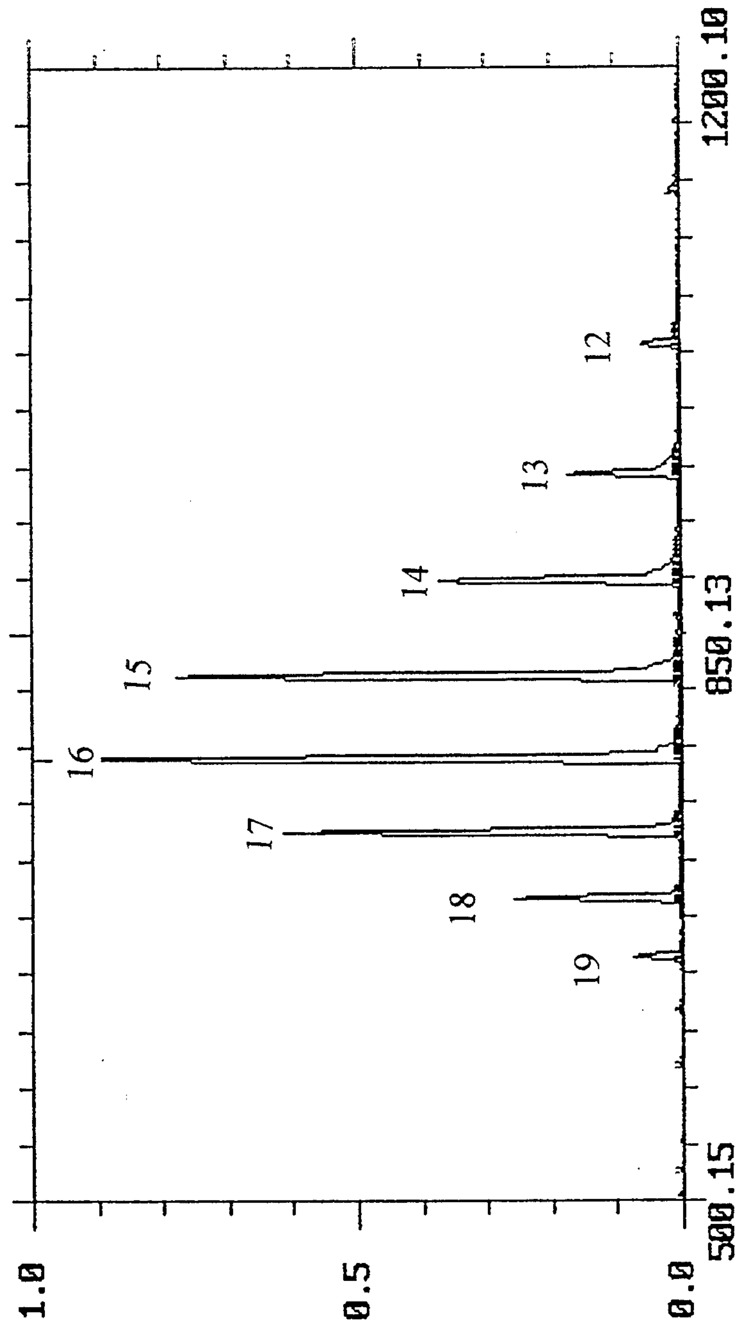
FIG. 1 is a representative plot of signal versus mass/-charge ratio for the case of Cytochrome C produced using an Electrospray ion source.

It is desirable to use real measurements for illustrating the features of data analysis by the invention. Therefore, ESMS spectra were obtained with cytochrome C (Sigma), a much studied protein with an Mr of 12,360. A solution comprising 0.1 g/L in 1:1 methanol:water containing 2% acetic acid was introduced at a rate of 1 uL/min into an ES ion source (Analytica of Branford) coupled to a quadrupole mass analyzer (Hewlett-Packard 5988) that incorporated a multiplier-detector operating in an analog mode. The data system was modified to allow acquisition and storage of "raw" data in the form of digitized points at intervals of 0.1 dalton from the instrument's standard A/D converter. Other types of mass spectrometers or ion sources can be used to produce measured spectra. The typical spectrum shown in FIG. 1 is an average of 8 sequential mass scans at a resolution of 800. Note that the spectrum contains several large peak. These peaks correspond to Cytochrome molecules attached to which are ions of Hydrogen. The number above each peaks shows the number of protons attached to a cytochrome molecule. Notice that each peak is separated from the other by the addition of one proton. In general, the position of each peak can be described by the following equation:

$$x_i = Mr/i + m_a \qquad (1a)$$

where $x_i$ is the m/z value for an ion comprising a parent molecule of molecular weight Mr with i adduct charges of mass $m_a$ which we will assume for the moment is the same for all ions. ma is not restricted to the mass of a proton. Its value is dependent upon the mass of the ion which attaches to the parent molecule. In fact, the value of ma may even be negative for example, if parent molecule is charged by the loss of charged mass. Because i can have only integral values the ES mass spectrum of a species that forms multiply charged ions will comprise a peak at $x_i$ plus a series of additional peaks corresponding to ions with i+1, i+2, . . . i+n charges having m/z values of:

$$x_{i+1} = Mr/(i+1) + m_a \qquad (1b)$$

$$x_{i+2} = Mr/(i+2) + m_a \qquad (1c)$$

$$x_{i+3} = Mr/(i+3) + m_a \qquad (1d)$$

As noted earlier, each peak in this series has three unknowns, Mr, i and $m_a$. As long as $m_a$ remains the same for all ions associated with each peak, Mr, $m_a$ and i can be obtained from the values of x for any three peaks in the series by explicit simultaneous solution of Eqs. 1 for those three peaks. An independent value of Mr can be obtained from each different combination of three peaks. The resulting set of Mr values can be averaged in any of several ways to give a most probable or best value.

The deconvolution alternative to explicitly solving eqs. 1 is to instruct a computer to add measured ion currents at all m/z values in the spectrum that correspond to ions of a test parent species with an assumed value of Mr and some assumed integral number of adduct charges of a specified mass $m_a$. The resulting sum is taken as the current that would have been obtained if all the ions of that parent species had been singly charged. Clearly, in order to carry out such an instruction the computer would have to be provided with values for the masses of the parent and adduct species, both of which are unknown a priori. A value of $m_a$ for the adduct charge can usually be assumed on the basis of the nature of the analyte. For example, with peptides and proteins the adduct charge is a generally a proton. If necessary, the assumed value can be checked experimentally by dosing the sample with additional amounts of the assumed adduct species and noting the effect on the location and height of spectral peaks. However, no such procedures can be invoked to arrive at a value of Mr for the parent species which, after all, is what one wants to learn from the spectrum. To get around this problem the computer is told to carry out the adding procedure for all reasonably possible values of Mr. The value of Mr giving rise to the largest sum is taken to be the correct value for the species because it is the value that best fits the spectrum.

This adding procedure can be represented by:

$$H(Mr^*) = \sum_{i_{min}}^{i_{max}} h(Mr^*/i + m_a) \qquad (2)$$

where $$i_{min} = INT[Mr/(x_f - m_a)]$$

-continued $$i_{max} = INT[Mr/(x_s - m_a)]$$

in which the function INT denotes the integer closest to each argument $Mr^*/(x_f - m_a)$ or $Mr^*/(x_s - m_a)$. H(Mr*) represents, for a particular initial choice of Mr (i.e. Mr*), the sum of all values of $h = h(Mr^*/i + m_a)$ where h is the measured signal (ion current, peak height) at an m/z value corresponding to the assumed value of $m_a$ and the chosen value Mr* with some value of i within the range from $i_{min}$ to $i_{max}$. The summation of Eq. 2 is carried out for all values of Mr* that are consonant with the range of values for m/z and i spanned by the peaks in the measured spectrum. To define this range it suffices to make rough estimates of i based the locations of any pair of peaks on the m/z scale of the spectrum. It is easy to show that the best value of Mr for the parent species is the $M_r^*$ which provides the largest total for the summation of Eq. 2. Eq. (2) forms the basis of both the Mann-Fenn and the Zhou algorithms. The calculated spectrum shown in FIG. 2 was obtained by a direct application of Eq. 2 to the measured spectrum shown in FIG. 1.

Figure 3:
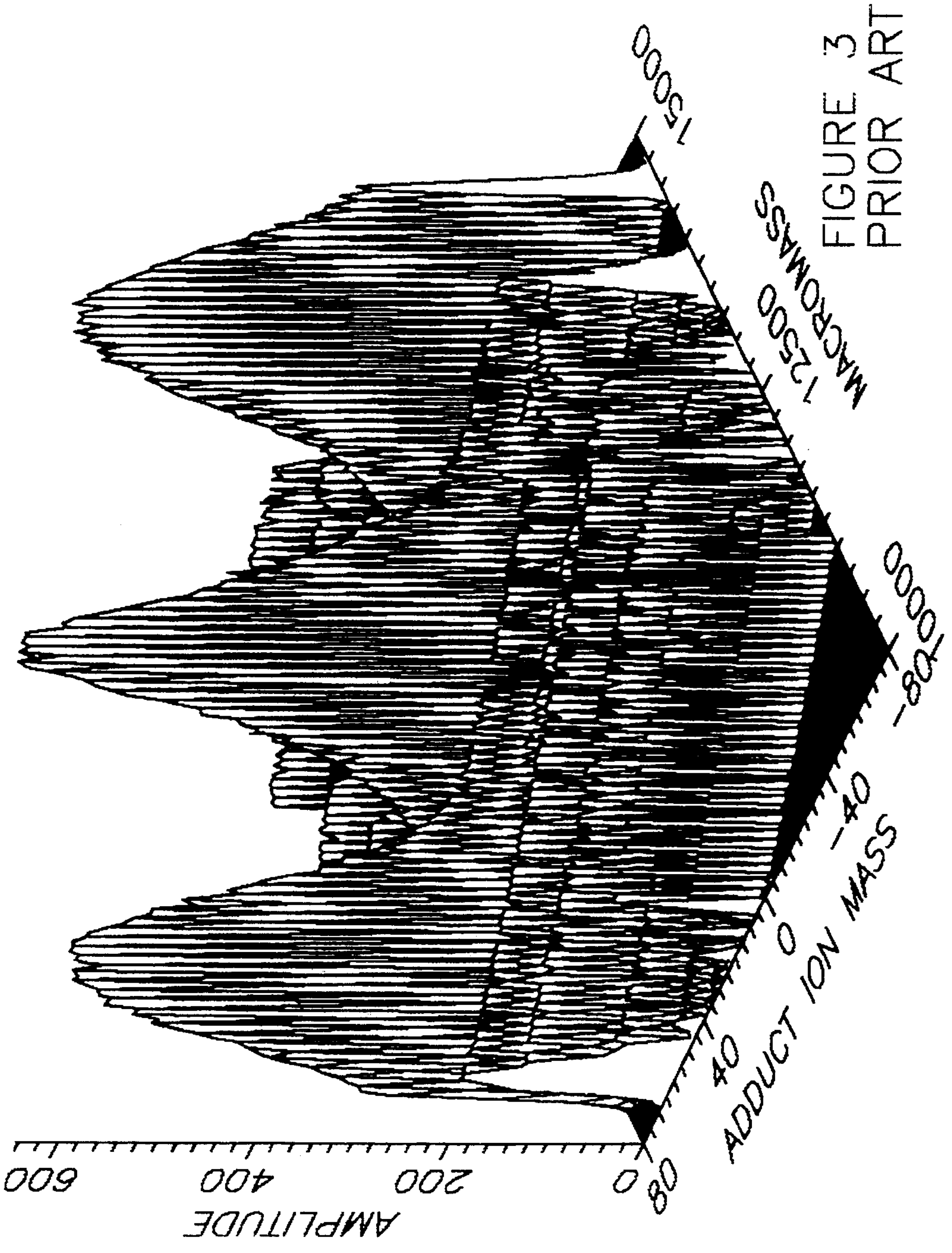
FIGURE 3 PRIOR ART
FIG. 3 is a representation of a 3-D calculated surface spectrum obtained without noise suppression.

As mentioned above, The 2-D approach described above works very well if the assumed value of mass $m_a$ of the adduct charge and the m/z scale of the analyzer are reasonably accurate. We can avoid the need to assume a value for $m_a$ by allowing the calculated signal for a particular ion species to depend upon both Mr and $m_a$ [Labowsky [U.S. Pat. No. 5,300,771] and Labowsky et.al. [Rapid Comm in Mass Spectro, Vol 7, PP 71–84 (1993)]]. In that case a 3-D surface is required for a geometric representation of the dependence of calculated signal (ion current) on two variables so that Eq. 2 becomes:

$$H(M_r, m_a) = \sum_{i_{min}}^{i_{max}} h(M_r/i + m_a) \qquad (3)$$

where the summation must be carried out over the applicable ranges for both Mr and $m_a$. Thus, the summation of Eq. 2 represents simply the summation of Eq. 3 for a particular value of $m_a$. In geometric terms, the deconvoluted spectrum resulting from Eq. 2 is the intersection of a plane of constant $m_a$ with the surface of Eq. 3. The topography of that surface helps the user identify the optimum value of $m_a$. In addition it provides a measure of the linearity of the m/z scale of the mass analyzer. FIG. 3 shows the result of applying the deconvolution procedure of Eq. 3 to the measured spectrum of cytochrome C shown in FIG. 1.

Figure 2:
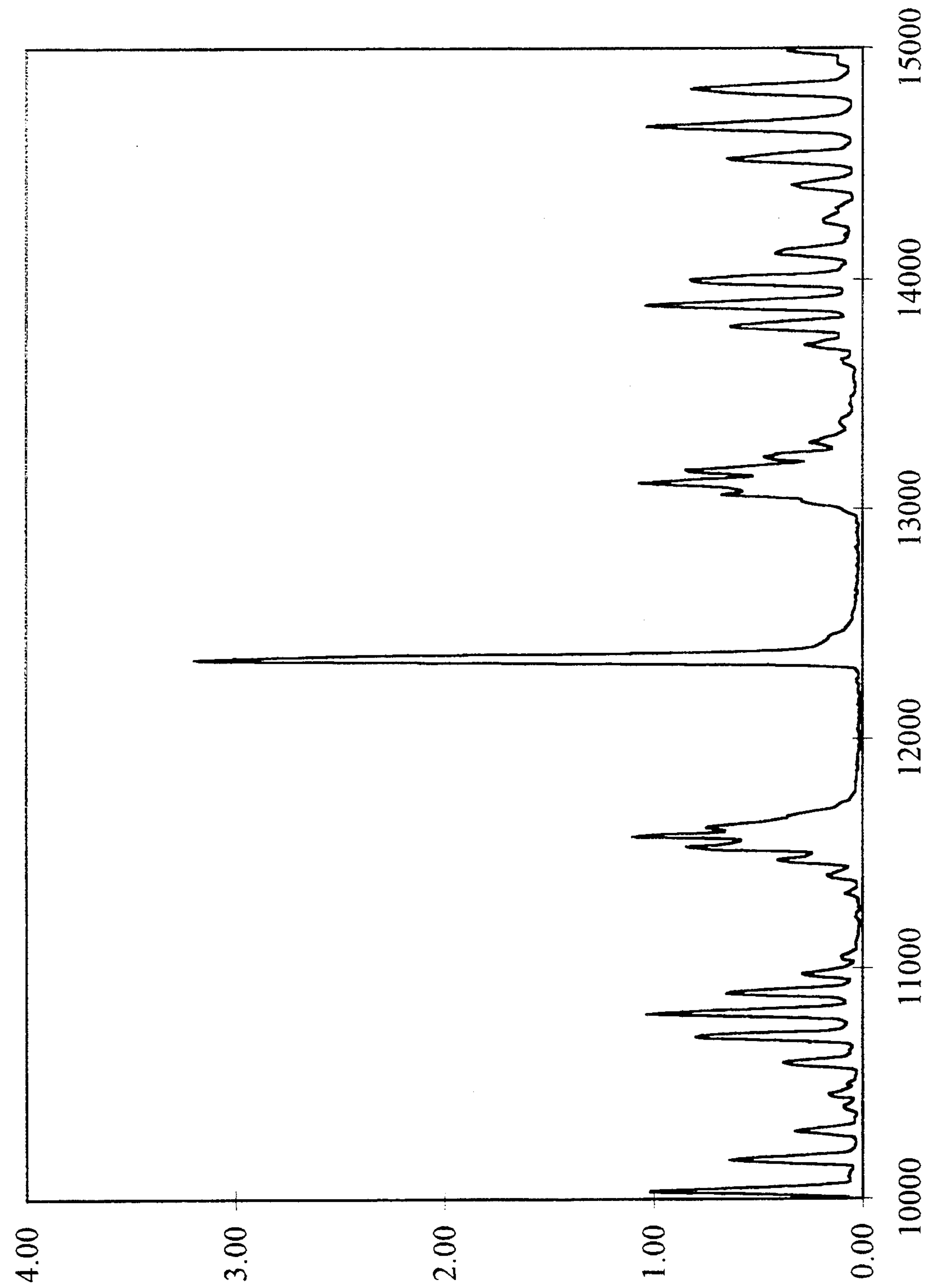
FIGURE 2 PRIOR ART
FIG. 2 is a representation of a 2-D calculated spectrum obtained by applying the Mann-Fenn algorithm without noise suppression to the measured spectrum shown in FIG. 1.

The noise and artifact peaks evident in FIGS. 2 and 3 can be eliminated by applying filter functions to the deconvolution equations represented by Eqs. 2 and 3. For the 3-D case these filter functions may be represented as:

$$H(Mr, ma) = F\left[\sum_{imin}^{imax} h_f(Mr/i + ma)\right] \qquad (4a)$$

which reduces to $$H(Mr) = F\left[\sum_{imin}^{imax} h_f(Mr/i + ma)\right] \qquad (4b)$$

for the 2-D case in which ma is treated as a constant. $h_t$ represents a "thresholded" signal. $h_t$ has the same value as the measured signal (h) provided $h_t$ is greater than a specified threshold value. If h is less than or equal to the threshold value, $h_t$ is assigned a value of zero. The symbol F in the above equations represents one or more of several possible filter functions that can be applied and will be described. These filter functions can exclude noise and allow contributions to the summation only from those terms of the measured spectrum that have a designated coherence. They are analogous to conventional electrical filters that combine "high-pass" and "low-pass" elements so as to pass only those signals within a specified frequency range. The filters F of Eq. 4 have "high-pass" and "low-pass" coherence characteristics. The low-pass filter sets the calculated signal (H) for a given point ($Mr^*$, $m_a$) to zero unless there are at least a specified minimum number of consecutive terms in Eqn. (4) for which the measured signal(h) is greater than a specified minimum or threshold value. In other words, the contribution to the sum for a particular value of $Mr^*$ will be zero unless there is a contribution greater than the threshold value from each of a minimum number of consecutive signals in the measured spectrum. For example, if the low-pass filter is set at 2, then the contribution to the summing of Eq. 4 for a particular test values of $Mr^*$ and $m_a$ will be zero unless at least two consecutive terms (for two consecutive values of i) have a value above the specified threshold. In other words there will be no contribution from incidental peaks whose m/z values happen to coincide with one particular combination of values for $Mr^*$, $m_a$ and i, unless there are two such incidental peaks for which there is coincidence with terms in the summation for two consecutive values of i. Increasing the setting (number of consecutive terms required) for the low-pass filter increases the filtering effect by eliminating more noise and decreasing the probability of chance coincidence.

An important feature of a filter is its "threshold" setting. If this setting is too low, then the filtering effect may be too small to serve any useful purpose. Indeed, if it is set at zero or below, then there is no filtering effect. Increasing the threshold value increases the filtering effect, allowing a smaller portion of signal in the measured spectrum to be included in the summation. If the threshold is set too high, i.e. above the signal strength from the highest peak in the measured spectrum, then there will be no contribution at all from the measured spectrum to the summation.

The high-pass filter works in a similar way except that it reduces the calculated signal (H) to zero if more than a specified number of consecutive terms in Eq. (4) are greater than the threshold value. For example, if the high-pass filter is set to 5, then any value of $Mr^*$, for which there are more than 5 consecutive summation terms greater than the threshold, will give rise to a zero calculated signal (H). Working with the low and high filters, one can "tune" the nature of the deconvoluted spectrum to the requirements of a particular case. For example, if both high-pass and low-pass filters are set to 4, then only those values of $Mr^*$ that give rise to four, and only four, consecutive summation terms (coherent peaks) with magnitudes greater than the threshold value will produce a non-zero value for the summation of Eq. 4.

It should be mentioned that the above filters can also be applied in conjunction with a certain specified high limit on the measured signal. The high limit works in a similar way to the threshold limit except the high limit sets to zero any measured signal that is greater than a certain specified value. This high limit can effectively be used to block out the contributions of dominant peaks in the measured spectrum. This would be desirable, for example, when one is interested in identifying the mass of secondary components represented in the spectrum.

The coherence filter described above may also include a shape filter. The envelop over the peaks in a multiply charged polyatomic molecule usually monotonically increases at low m/z, reaches a maximum and then monotonically decreases at higher m/z values. The spectrum shown in FIG. 1 is fairly typical of this monotonically increasing and monotonically decreasing behavior. It is rare that the increase or decrease is non-monotonic. A shape filter would reject any set of otherwise coherent series of peaks that is non-monotonic. The filter can reject either the entire series or it could reject that part that is non-monotonic. Such a filter would work as follows. After selecting values of $Mr^*$ and $m_a$, the summation in Eqn. (4) is performed. If the signal in the measured spectrum (h) at a summation point, $Mr^*/i+m_a$, is less than a certain specified percentage of the signals at $Mr^*/(i+1)+m_a$ and $Mr^*/(i-1)+m_a$, then the measured signal at that summation point is treated as if it has a value of zero for this particular combination of $Mr^*$ and $m_a$. If the remaining summation points in the series exhibit the appropriate monotonic increase/decrease behavior and the number of such summation points (terms) is sufficient to pass through the coherence filter then a non-zero signal (H) will be calculated for the point $Mr^*$,$m_a$. If, on the other hand the number of well behaved summation points(-terms) does not pass through the coherence filter, the point $Mr^*$,$m_a$ is assigned a calculated signal (H) of zero.

Various other modifications can be made to basic equation 4. For example, an "enhancer" function can be used to accentuate the calculated spectrum. There are many types of enhancer functions which may be employed and may be represented in the following generalized forms:

$$H((Mr^*,ma) = E\left[F\left[\sum_{imin}^{imax} h_t(Mr^*/i + ma)\right]\right] \tag{5a}$$

or $$H((Mr^*,ma) = F\left[\sum_{imin}^{imax} E[h_t(Mr^*/i + ma)]\right] \tag{5b}$$

In Eq. (5a) an enhancer function is applied to the value of the summation and may be referred to as "series" enhancement. In equation (5b) the enhancement function is applied to the individual terms in the series. This type of enhancement may be referred to as "term" enhancement. In either embodiment of the enhancer, the measured signal at a calculation point will be assigned a value of zero if that signal is not greater than the specified threshold value at that point.

One example of "series" enhancer is to raise the calculated signal to some power, expressed as an exponent, N. For example, and enhanced form of Eqn. (4) may be written as:

$$H(M^*,m_a) = \left[ F \left[ \sum_{i_{min}}^{i_{max}} h_t(M^*/i + m_a) \right] \right]^N \quad (6a)$$

which reduces to:

$$H(M^*) = \left[ F \left[ \sum_{i_{min}}^{i_{max}} [h_t(M^*/i + m_a)] \right] \right]^N \quad (6b)$$

for the 2-D case in which ma is treated as a constant. This form of an enhancer in which an exponent is used will be referred to as "power" enhancement. If the enhancer exponent N is set at a value greater than 1, its effect is to enhance contributions to the summation from the higher peaks in the measured spectrum and to attenuate contributions from the smaller peaks. Such enhancement of the contribution of the larger peaks makes identification of the true value of Mr more rapid and more positive for major species in the analyte sample. If the enhancer exponent N is set to a value less than 1 but greater than zero, the difference in contribution from the larger and the smaller peaks in the calculated spectrum is decreased. If N is given a negative value, contributions from the smaller peaks in the measured spectrum are enhanced relative to contributions from larger peaks. Such "negative enhancement" can be very useful when one is interested in trace components in a sample mixture. A value of zero N represents a special case for which the summation of Eq. 6 becomes either unity or zero. This choice for N can provide a convenient means of determining whether species with particular values of Mr are present or absent in a sample. When N is unity, of course, Eq. 6 becomes identical with Eq. 4 and there is no enhancement.

An example of "term" enhancement is demonstrated in Eq. (7):

$$H(Mr^*,m_a) = F \left[ \sum_{i_{min}}^{i_{max}} \{h_t(Mr^*/i + m)\}^N \right] \quad (7a)$$

which reduces to:

$$H(Mr^*) = F \left[ \sum_{i_{min}}^{i_{max}} \{h_t(Mr^*/i + m)\}^N \right] \quad (7b)$$

for the 2-D case in which ma is treated as a constant. In this form the operation defined by the equation produces an effect similar to that of Eq. (6). When the enhancer exponent is set to the special case of 0, however, the summation total is equal to the number of peaks in the parent spectrum that form part of a coherent series. Consequently, the result produced by Eq. 7 with N=0 may be considered a "coherence check." It allows the user to find the value of Mr* whose ions provide the greatest number of peaks in a coherent sequence. This coherence check has the effect of making all terms in the argument of the summation in Eq. 6 have the same value, i.e. unity. In other words, all peaks in the measured spectrum that are part of a coherent series are given the same weighting. A coherence check is a valuable tool when trying to decide values for the coherence filters. For example if the low filter were set to zero and the high filter to some large number so there is no filtering effect, a coherence check will show the user the values of (Mr* and ma) at which the coherence is a maximum. This could be used as a guide in setting the values of the coherence filter. One would want to set the low filter so it is less than the maximum coherence. Indeed, if the low filter were set above the maximum coherence, then all of the calculated signal will be filtered out. For example, if a coherence check shows a maximum coherence of 5, an appropriate choice of the low filter might be 3 or 4.

While the use of an exponential in enhancing the calculated signal is convenient, other types of enhancement represented by Eq. (6) are of course possible and would be included within the scope of the present invention. As another example of "series" enhancement, the calculation series may be placed inside an exponential:

$$H(Mr^*,ma) = \exp\left( kF \left[ \sum_{imin}^{imax} h_t(Mr^*/i + ma) \right] \right) \quad (8a)$$

where k is a constant which may be either positive or negative. Alternatively, a "term" exponential enhancer may be written as:

$$H(Mr^*,ma) = F \left[ \sum_{imin}^{imax} \exp(kh_t(Mr^*/i + ma)) \right] \quad (8b)$$

Both forms of Eq. (8) can of course be written for the 2-D case. Other modifications to the above scheme should be clear to anyone skilled in the art.

Still other forms of Eq. 4 may be useful. As mentioned above, the original Mann-Fenn algorithm suffers from a "high mass" bias. In other words, the calculated signal tends to be larger for the higher molecular weights because as the molecular weight increases, the number of terms in the calculation series (Eq. (4)) also increases. In the case of a noisy spectrum in which no threshold is used, the terms in these series may be nonzero because a spurious noise spike happens to appear at a calculation point within the series. The more terms in the series, the more potential effect of these noise spikes on the value of the calculated signal. One way around this problem, of course is to increase the threshold to eliminate the baseline noise and to use the coherence filters. One may also define various average signals which would compensate for inclusion of spurious noise peaks. For example, an average calculated signal may be defined as the calculated signal obtained form Eq. (4) divided by an appropriate averaging factor (af).

$$H(Mr^*,m_a) = F \left[ \sum_{i_{min}}^{i_{max}} h_t(Mr^*/i + m_a)]/af \right] \quad (9a)$$

which reduces to:

$$H(Mr^*) = F \left[ \sum_{i_{min}}^{i_{max}} h_t(Mr^*/i + m_a)]/af \right] \quad (9b)$$

for the 2-D case in which ma is treated as a constant. There are several possible choices for the averaging factor. It may be assigned the total number of terms in the calculation series (imax−imin+1). Such a choice for af would reduce the high mass bias observed in the original Fenn-Mann algorithm. Another choice for af might be the total number of coherent terms in the calculation series. In this case the average calculated signal is assigned a value of zero if there are no coherent terms. Still another possibility would be to chose the maximum measured signal within a given series as the averaging factor. In using such an averaging factor, a series for a given Mr* and ma is scanned for the maximum measured signal in that series. The calculated signal is assigned a value of zero if the maximum measured signal for a given series is below the threshold signal value. If the maximum measured signal is greater than the threshold signal value then the calculated signal is evaluated as above.

Such averaging can also be carried out with enhancing in place. In the 3-D case "series" enhancement may be represented as:

$$H(Mr^*,m_a) = E\left[F\left[\sum_{i_{min}}^{i_{max}} \{h_t(Mr^*/i + m_a)/af\}\right]\right] \quad (10a)$$

which reduces to:

$$H(Mr^*) = E\left[F\left[\sum_{i_{min}}^{i_{max}} \{h_t(Mr^*/i + m_a)/af\}\right]\right] \quad (10b)$$

for the 2-D case. Alternatively, "term" enhancement may be represented as:

$$H(Mr^*,m_a) = F\left[\left\{\sum_{i_{min}}^{i_{max}} E[h_t(Mr^*/i + m_a)/af]\right\}\right] \quad (11a)$$

for the 3-D case which reduces to $$H(Mr^*) = F\left[\left\{\sum_{i_{min}}^{i_{max}} E[h_t(Mr^*/i + m_a)/af]\right\}\right] \quad (11b)$$

for the 2-D case. It will be clear to those skilled in the art that there are many other variations on the theme of Eqs. 4–11 that can be formulated to achieve a particular purpose.

It should be noted that the enhancement and averaging can be applied independent of coherence filters. That is, enhancement and averaging can be applied directly to an algorithm based on the original Mann-Fenn Algorithm. Indeed, the original Mann-Fenn algorithm for the 2-D case is recovered when the coherence filtering is turned off by setting the low coherence filter to a setting of 1 or less and the high coherence filter to a value greater than the maximum number of coherent peaks for a given spectrum. Hence, the Mann-Fenn 2-D algorithm represents a special case of the present patent in which the filtering functions are turned off. When the filters are turned off, for example, Eqn. (6a) would become, $$H(Mr^*,m_a) = E\left[\sum_{i_{min}}^{i_{max}} \{h_t(Mr^*/i + m)\}\right] \quad (12a)$$

which reduces to:

$$H(Mr^*) = E\left[\sum_{i_{min}}^{i_{max}} \{h_t(Mr^*/i + m)\}\right] \quad (12b)$$

for the 2-D case in which ma is treated as a constant. Similar expressions could be written for Eqns. (7) to (11).

In order to use Eqs. 4–11, or other variations of the principles they embody, in practicing the invention, one must first stipulate proper and appropriate definitions of the quantities they incorporate. These quantities include the limits defining the ranges of the variables including the mass of the parent species ($Mr^*_s$, $Mr^*_f$), the mass of the adduct charges ($m_{as}$, $m_{af}$). In addition, to achieve a desired purpose the particular equation selected must be appropriately formulated by specifying such characteristics as the filter functions (F's) and their settings, as well as the values and operands of any operators to achieve particular effects such as preferential enhancement. One must also decide if an average calculated signal would be appropriate. In some instances, one may select several of the above options to analyze a given spectrum.

Figure 4:
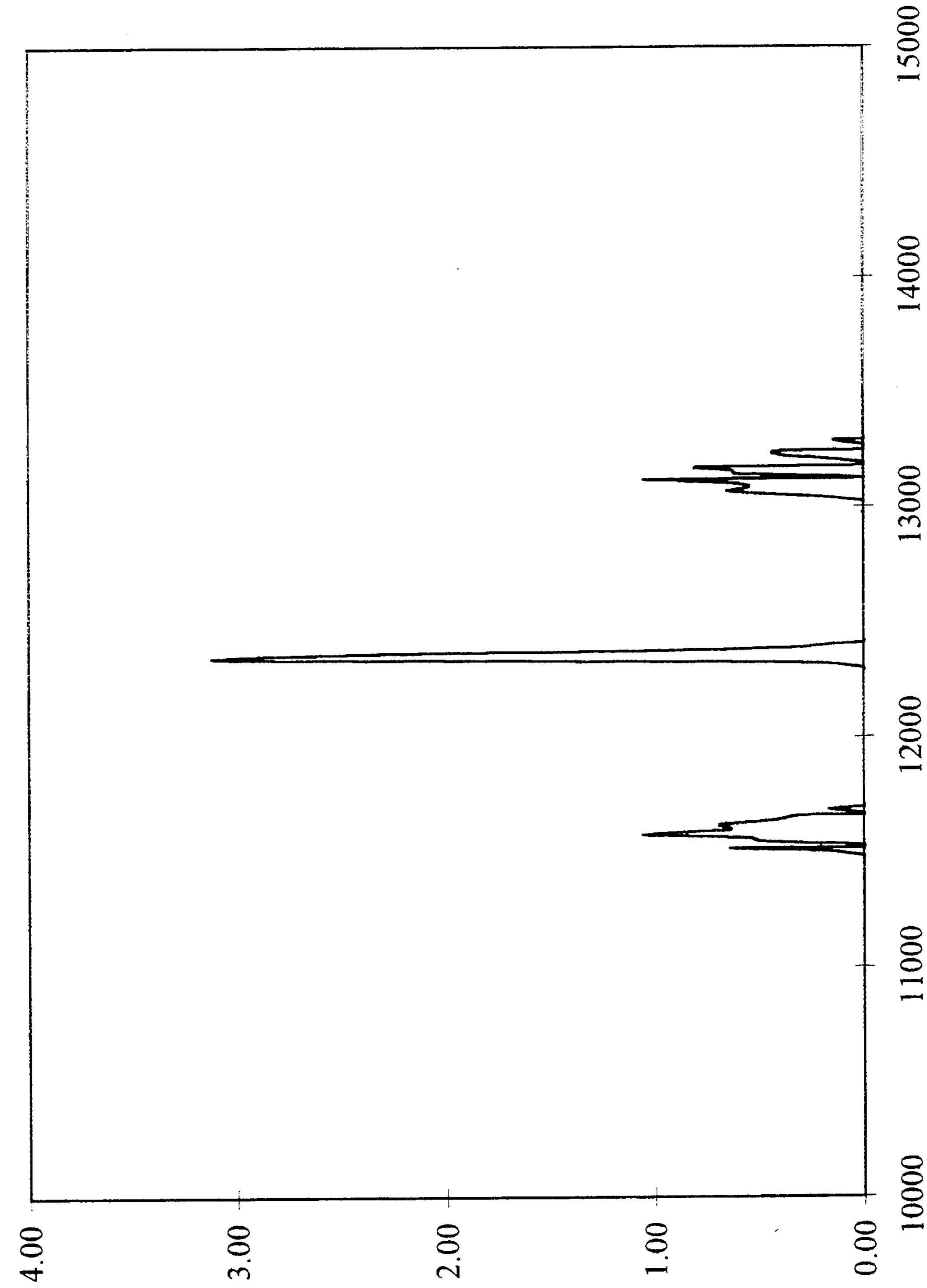
FIG. 4 is a representation of a 2-D calculated spectrum in which the low coherence filter used in Eqn. (4) is set to 2.
Figure 5:
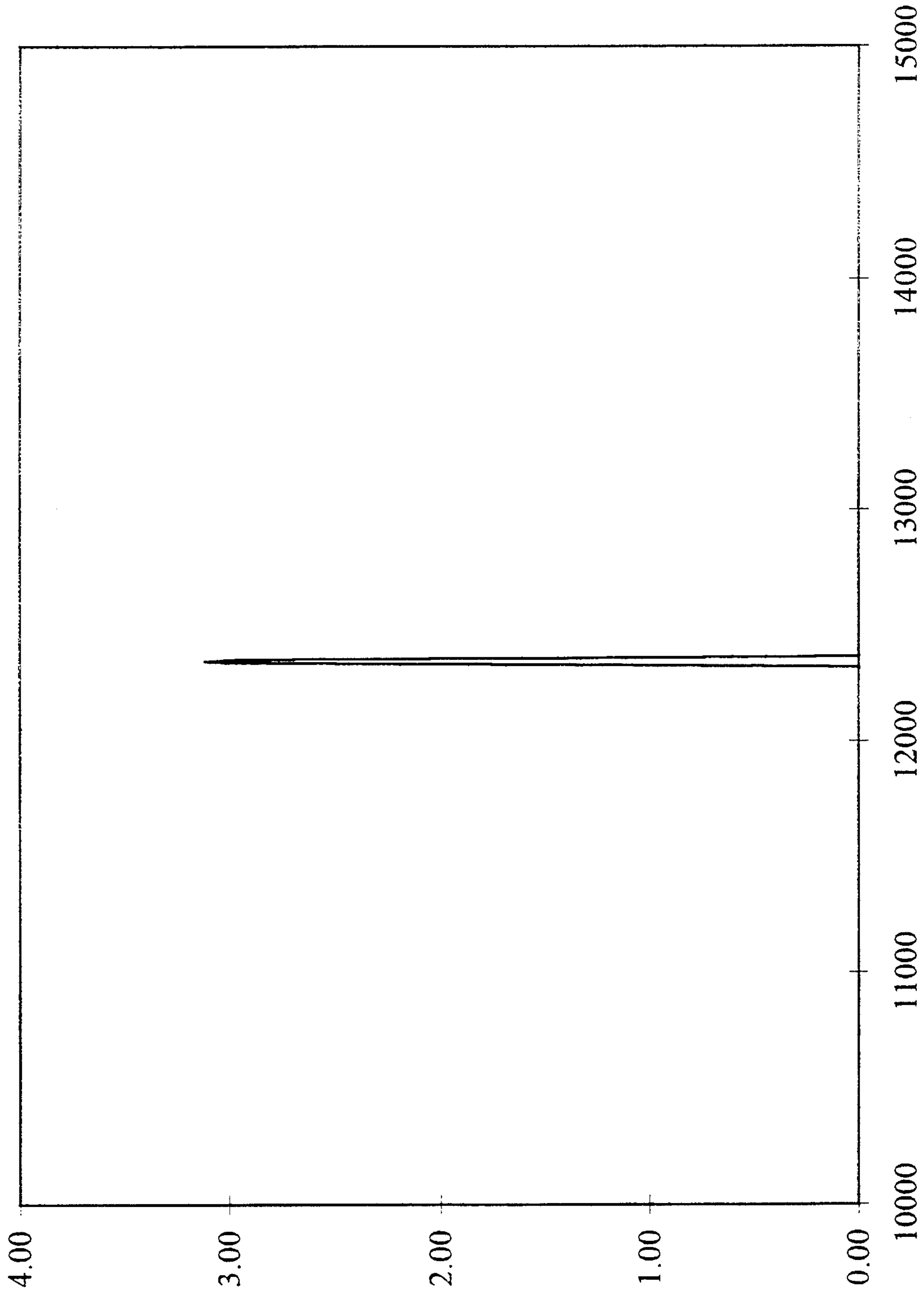
FIG. 5 is a representation of a 2-D calculated spectrum in which the low coherence filter used in Eqn. (4) is set to 7.
Figure 6:
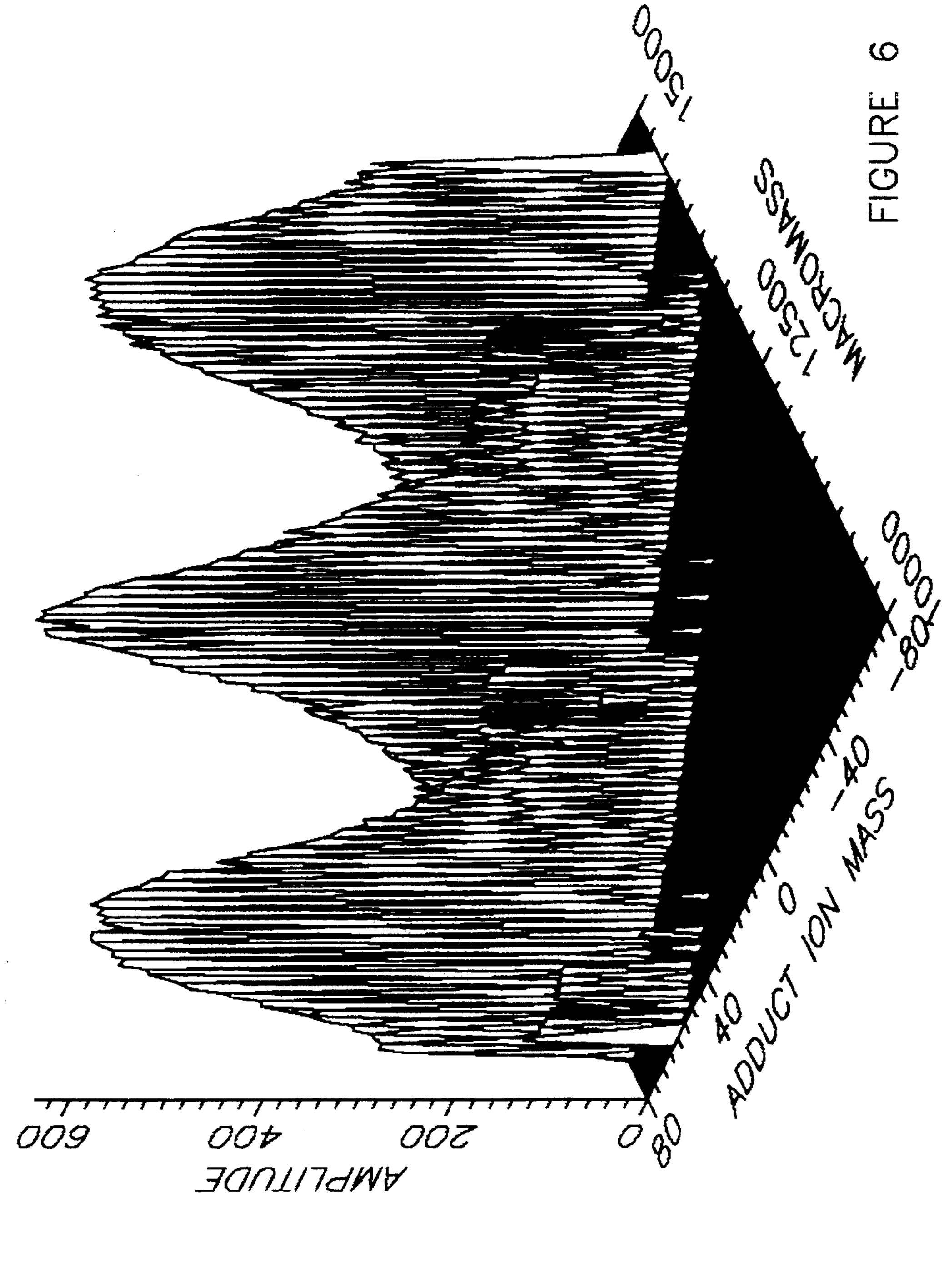
FIG. 6 is a representation of a 3-D calculated surface in which the low coherence filter is set to 2.
Figure 7:
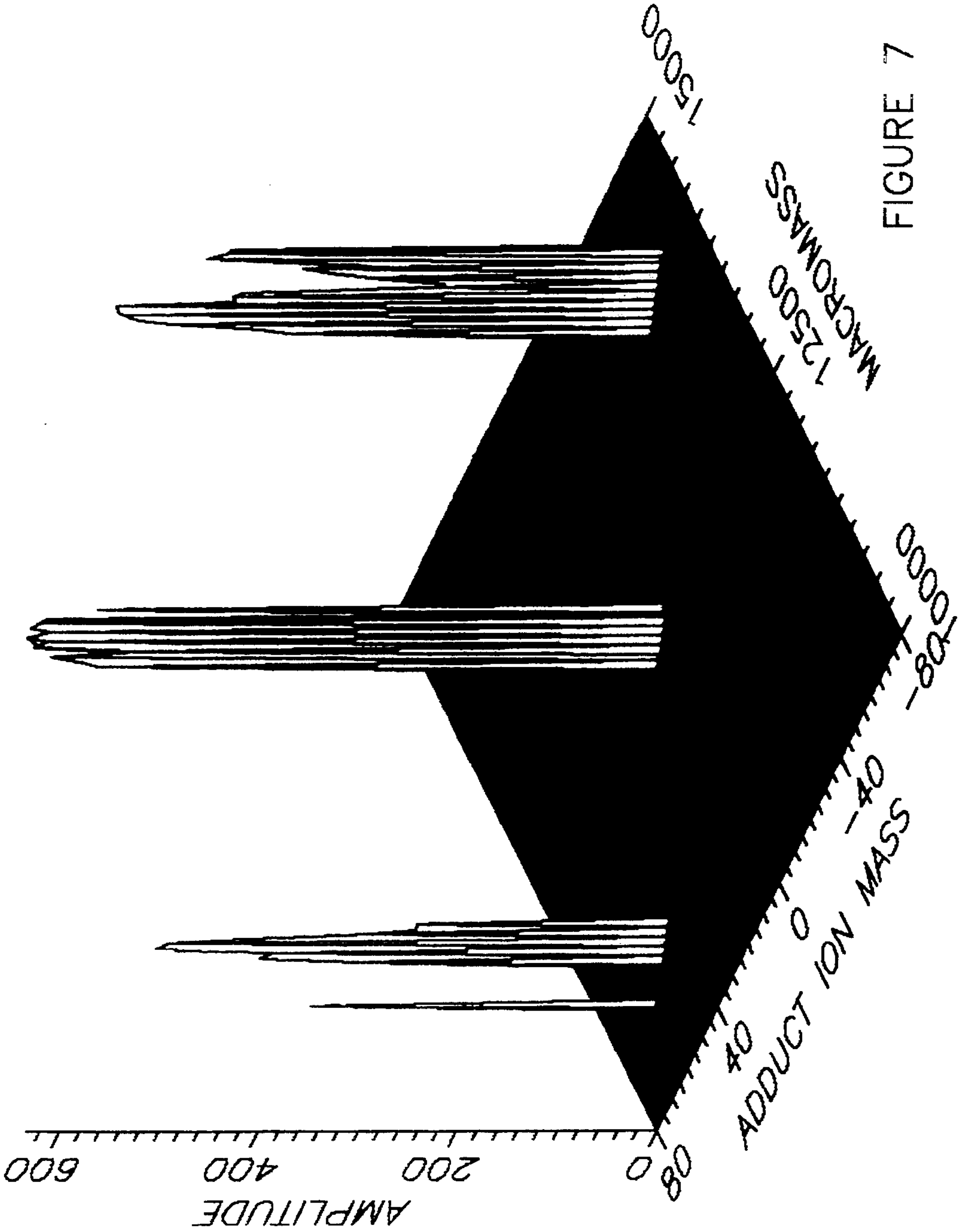
FIG. 7 is a representation of a 3-D calculated surface in which the low coherence filter is set to 7.

In order to demonstrate the effectiveness of the above described invention in reducing the noise in a calculated spectrum, compare FIG. 2 with FIGS. 4 and 5. FIG. 2 shows the 2-D cross-section calculation using the Mann-Fenn algorithm without filtering (i.e. low coherence filter set below 2 and high coherence filter set high, threshold value set to zero, no enhancing, no averaging). FIG. 4 shows a calculated spectrum in which the low filter is set to 2. The threshold value in this and all of the filtered spectrum was set at 5% of the highest signal in the measured spectrum. As may be seen, much of the noise near the baseline is eliminated. Increasing the low filter to 7 (FIG. 5) eliminates more of the noise and allows the dominant peak in the calculated spectrum to become very obvious. FIGS. 3, 6 and 7, show the effects of filtering on a 3-D surface. FIG. 3 shows the surface with no-filtering. FIG. 6 shows the surface when the low filter is set to 2 and FIG. 7 shows the surface when the low filter is set to 7. Again, these figures clearly show how increasing coherence filtering decreases noise and makes easier identification of the species present in a spectrum.

Figure 8:
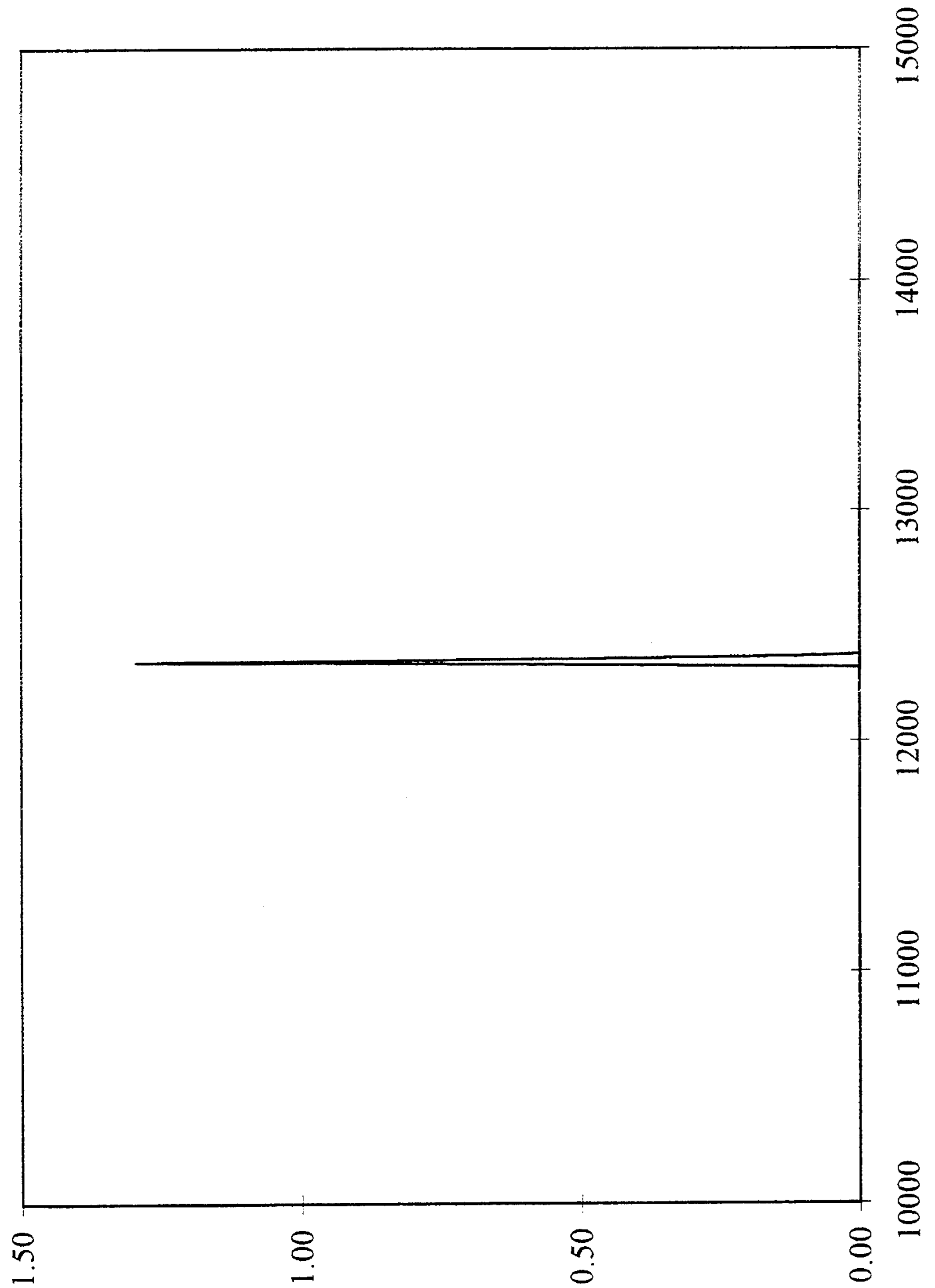
FIG. 8 is a representation of a 2-D calculated spectrum in which the low coherence filter is set to 2 and the enhancer factor is set to 5.
Figure 9:
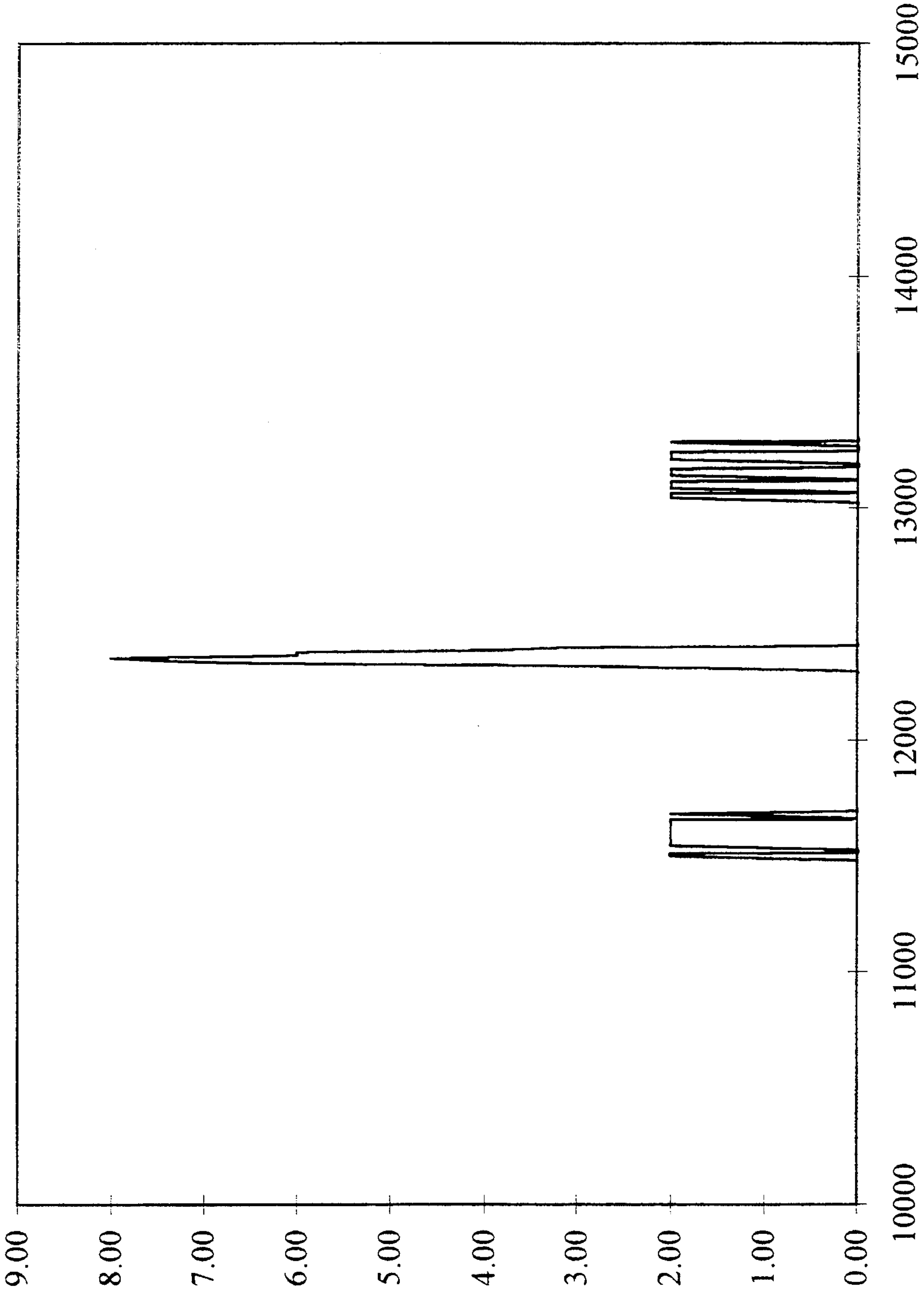
FIG. 9 is a representation of a 2-D spectrum in which the enhancer factor in Eqn. (6) is set to zero.

FIG. 8 shows the effect of using an enhancer function. For this particular case, a power enhancer is used. The exponent in the power enhancer is set to 5 and the low filter is 2. A comparison of FIG. (8) with FIG. (2) clearly shows that the enhancer accentuates the size of the dominant peak and decreases the size of the secondary peaks for this particular choice of enhancer factor. Finally, FIG. (9) shows a "coherence check" calculation. In this figure, the low filter is set to 2 and the power "term" enhancer exponent is set to 0. This figure shows that the maximum coherence for this spectrum is 8 in the dominant peak. The coherence of the two peaks on either side of the main peak is two. These peaks would be eliminated from the spectrum if the low coherence factor were set to 3.

I claim:

1. A method for determining the molecular weight Mr of a distinct polyatomic parent molecule species and the accuracy of said molecular weight determination comprising the steps of:

(i) Producing a primary population of multiply charged ions from a sample containing said distinct polyatomic parent molecular species, each one of said multiply charged ions being characterized by the symbol $x_i$, the numerical value of $x_i$ being the m/z value for said one of said multiply charged ions such that $x_i = Mr/i + m_a$ wherein Mr is the molecular weight of said distinct parent molecular species, i is an integer equal to the number of adduct charges attached to said distinct parent molecular species to form said multiply charged ion, and $m_a$ is the total mass of adduct charges on said one multiply charged ion, said primary population of ions comprising a plurality of sub-populations, the ions of each sub-population having the same values for i, $m_a$ and $M_r$, and therefore the same value of $x_i$, said plurality of said sub-populations comprising at least one sub-population for each possible integral value of i beginning with a minimum value and extending to and including a maximum value, said maximum value equal to said minimum value plus an integer no smaller than one;

(ii) mass-analyzing the ions of said primary population to obtain a set of experimental values for the relative abundance of ions in each of said sub-populations constituting said primary population of ions; and (iii) applying a deconvolution algorithm to said set of experimental value, said deconvolution algorithm incorporating filter functions based on coherence, said functions eliminating contributions to the deconvolution process due to noise, said functions further eliminating contributions of said deconvolution process due to ions in said primary population whose coherence falls outside specified coherence limits, said deconvolution algorithm transforming said set of experimental values for the relative abundances of ions in each of said sub-populations to calculated values for the relative abundances of said distinct polyatomic parent molecule.

2. The method in claim 1 in which ma is treated as an independent variable.

3. The method in claim 1 in which ma is treated as a known, constant value.

4. A method for determining the molecular weight Mr of a distinct polyatomic parent molecule species and the accuracy of said molecular weight determination comprising the steps of:

(i) Producing a primary population of multiply charged ions from a sample containing said distinct polyatomic parent molecular species, each one of said multiply charged ions being characterized by the symbol $x_i$, the numerical value of $x_i$ being the m/z value for said one of said multiply charged ions such that $x_i = Mr/i + m_a$ wherein Mr is the molecular weight of said distinct parent molecular species, i is an integer equal to the number of adduct charges attached to said distinct parent molecular species to form said multiply charged ion, and $m_a$ is the total mass of adduct charges on said one multiply charged ion, said primary population of ions comprising a plurality of sub-populations, the ions of each sub-population having the same values for i, $m_a$ and $M_r$, and therefore the same value of $x_i$, said plurality of said sub-populations comprising at least one sub-population for each possible integral value of i beginning with a minimum value and extending to and including a maximum value, said maximum value equal to said minimum value plus an integer no smaller than one;

(ii) mass-analyzing the ions of said primary population to obtain a set of experimental values for the relative abundance of ions in each of said sub-populations constituting said primary population of ions; and (iii) applying a deconvolution algorithm to said set of experimental values, said deconvolution algorithm incorporating enhancement functions, said deconvolution algorithm transforming said set of experimental values to calculated values for the relative abundances of said distinct polyatomic parent molecule.

5. The method in claim 4 in which ma is treated as an independent variable.

6. The method in claim 4 in which ma is treated as a known, constant value.

7. A method for determining the molecular weight Mr of a distinct polyatomic parent molecule species and the accuracy of said molecular weight determination comprising the steps of:

(i) Producing a primary population of multiply charged ions from a sample containing said distinct polyatomic parent molecular species, each one of said multiply charged ions being characterized by the symbol $x_i$, the numerical value of $x_i$ being the m/z value for said one of said multiply charged ions such that $x_i = Mr/i + m_a$ wherein Mr is the molecular weight of said distinct parent molecular species, i is an integer equal to the number of adduct charges attached to said distinct parent molecular species to form said multiply charged ion, and $m_a$ is the total mass of adduct charges on said one multiply charged ion, said primary population of ions comprising a plurality of sub-populations, the ions of each sub-population having the same values for i, $m_a$ and $M_r$, and therefore the same value of $x_i$, said plurality of said sub-populations comprising at least one sub-population for each possible integral value of i beginning with a minimum value and extending to and including a maximum value, said maximum value equal to said minimum value plus an integer no smaller than one;

(ii) mass-analyzing the ions of said primary population to obtain a set of experimental values for the relative abundance of ions in each of said sub-populations constituting said primary population of ions; and (iii) applying a deconvolution algorithm to said set of experimental values, said deconvolution algorithm incorporating averaging functions, said deconvolution algorithm transforming said set of experimental values to calculated values for the relative abundances of said distinct polyatomic parent molecule.

8. The method in claim 7 in which ma is treated as an independent variable.

9. The method in claim 7 in which ma is treated as a known, constant value.

* * * * *